G. F. WALTERS.
BALING PRESS.
APPLICATION FILED OCT. 31, 1910.
982,650.
Patented Jan. 24, 1911.
2 SHEETS—SHEET 1.
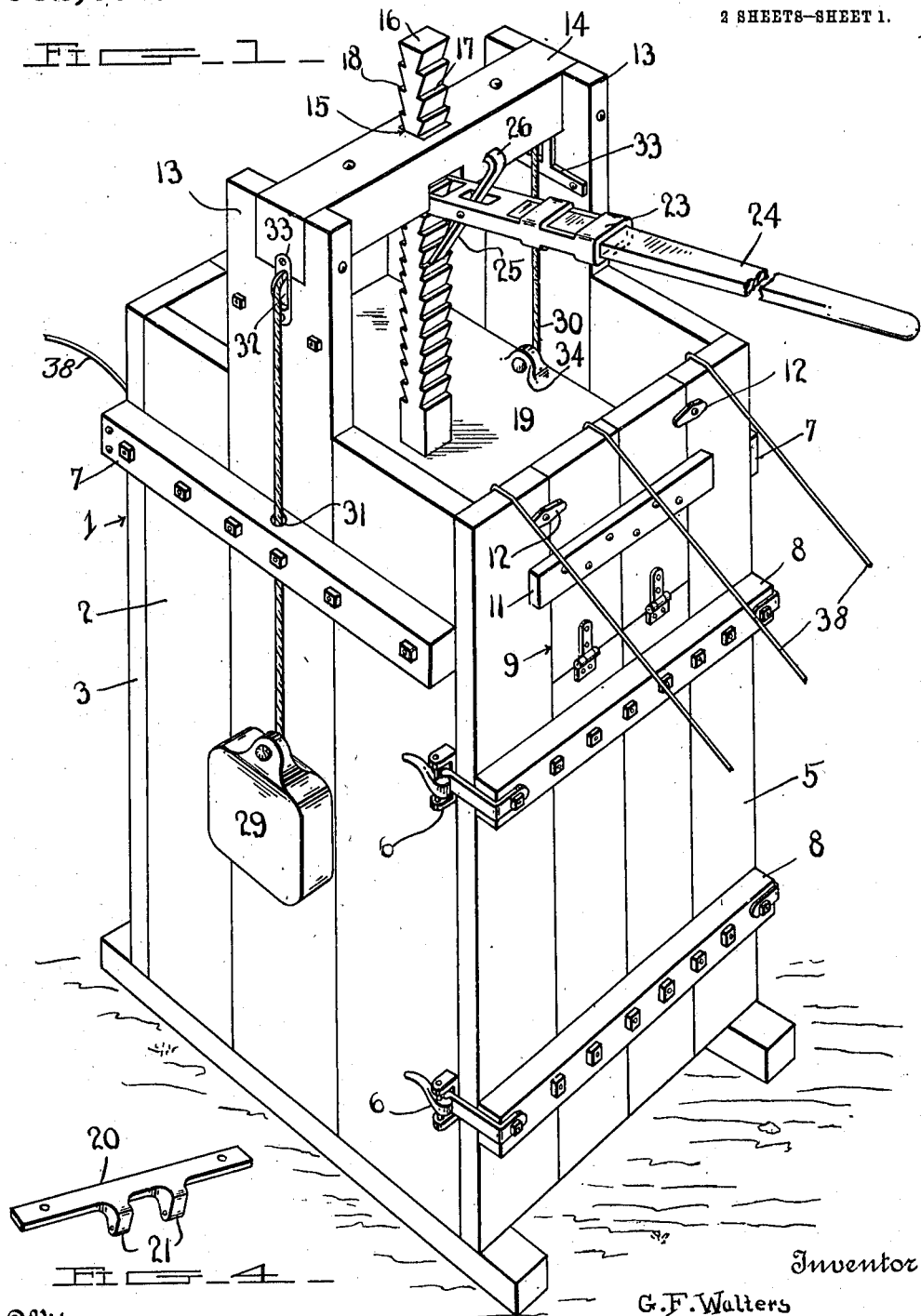
Witnesses
Inventor
G. F. Walters
by H. B. Willson & Co.
Attorneys

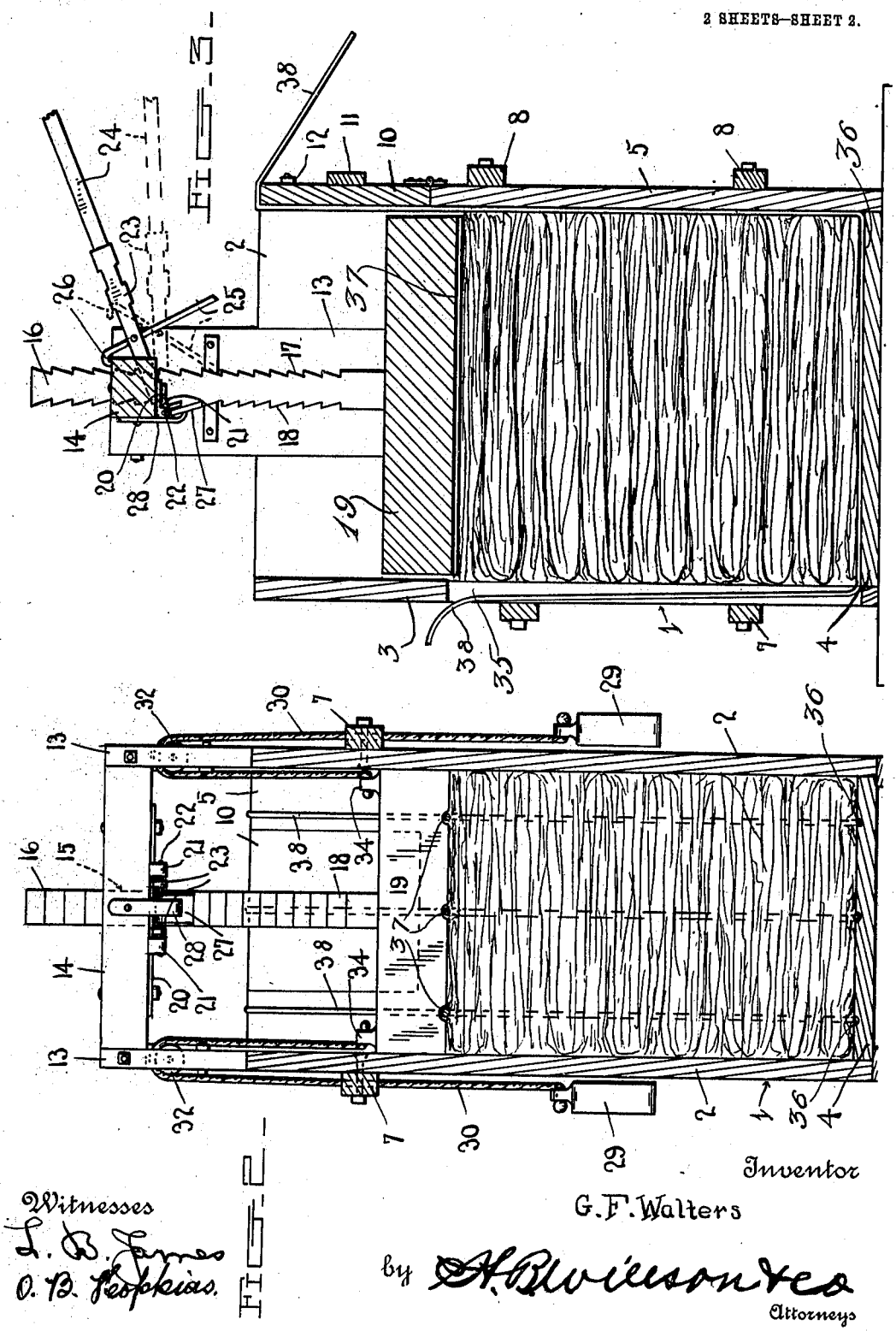

UNITED STATES PATENT OFFICE.

GEORGE F. WALTERS, OF FINDLAY, OHIO.

BALING-PRESS.

982,650.

Specification of Letters Patent.    Patented Jan. 24, 1911.

Application filed October 31, 1910. Serial No. 589,960.

*To all whom it may concern:*

Be it known that I, GEORGE F. WALTERS, a citizen of the United States, residing at Findlay, in the county of Hancock and State of Ohio, have invented certain new and useful Improvements in Baling-Presses; and I do declare the following to be a full, clear, and exact description of the invention, such as will enable others skilled in the art to which it appertains to make and use the same.

This invention relates to improvements in baling presses.

One object of the invention is to provide a baling press having an improved construction and arrangement of operating mechanism whereby the pressing plunger may be manually operated and projected into the baling chamber with great force thereby forming a tight closely packed bale.

Another object is to provide an improved means for retracting the plunger after the bale has been formed.

With the above and other objects in view, the invention consists of certain novel features of construction, combination and arrangement of parts as will be more fully described and particularly pointed out in the appended claims.

In the accompanying drawings; Figure 1 is a perspective view of a baling press constructed in accordance with the invention; Fig. 2 is a vertical sectional view of the baling chamber showing the plunger operating mechanism in side elevation; Fig. 3 is a similar view taken at right angles to Fig. 2 showing in dotted lines the manner in which the baling plunger is projected; Fig. 4 is a detail perspective view of the bearing plate for the plunger operating lever and holding pawl.

Referring more particularly to the drawing, 1 denotes the baling chamber of my improved press. The chamber 1 may be of any suitable shape and is here shown in the form of a rectangular box comprising sides 2, a rear end 3, a bottom 4 and a front end 5, said front end being in the form of a door which is hingedly connected to one edge of one of the sides 2 and is secured to the edge of the opposite side by suitable latches 6 whereby the same is tightly fastened in closed position. The sides and rear of the box are braced by suitable brace bars or cleats 7, which are bolted or otherwise secured to said rear end and sides. The door is also braced by cleats or brace bars 8 which are bolted thereto as shown. In the center of the upper portion of the main door 5 is formed a filling opening 9 which is normally closed by a hinged door 10 adapted to be swung outwardly and downwardly to facilitate the placing of material to be pressed into the baling chamber. The door 10 is braced and held against inward movement by a transverse cleat 11 which is secured to the outer side thereof and has its opposite ends projecting beyond the sides of the door and into engagement with the adjacent portions of the main door as shown. The door 10 is firmly held in closed position by suitable fastening means, said means being here shown in the form of turn buttons 12.

On the upper ends of the sides of the baling chamber are formed upwardly projecting posts or standards 13, said posts or standards being here shown as formed by a continuation of the central planks of the sides and the upper ends of said posts or standards are connected together by a cross bar 14 the ends of which are preferably set into the upper ends of the posts as shown. In the cross bar 14 is formed a centrally disposed rectangular passage 15 with which is slidably engaged a plunger operating bar 16 said bar having formed on one edge a series of ratchet teeth 17 and on its opposite edge a series of ratchet teeth 18. The lower end of the bar 16 is rigidly secured to a plunger 19 which fits closely in the baling chamber and is adapted to be forced down into the chamber to press the material therein.

Secured to the under side of the cross bar 14 adjacent to one edge thereof is a bearing plate 20 having formed thereon a pair of apertured bearing ears or lugs 21 in which is arranged a bearing shaft 22 with which is pivotally connected the inner bifurcated end of the handle socket 23 with the outer end of which is adapted to be engaged a plunger operating handle 24. Pivotally mounted in the handle socket 23 adjacent to the ratchet teeth 17 of the plunger operating bar is a plunger operating pawl 25 the lower end of which is adapted to be engaged with the ratchet teeth 17 whereby when the lever 24 is swung downwardly the plunger will be forced down into the baling chamber. The upper end of the pawl 25 projects above the socket 23 and has formed thereon a hook 26 which is adapted to be engaged with the upper side of the cross bar 14 and thereby support the socket 23 and operating lever 24 in an inoperative position. Also pivotally mounted on the shaft 22 is a plunger holding pawl 27 which is adapted to be swung into engagement with the ratchet teeth 18 on the adjacent side of the plunger bar 16. The pawl 27 is held in position to automatically engage the teeth 18 of the ratchet bar by a spring 28 which is pivotally secured to the adjacent side of the cross bar 14. When the spring is engaged with the pawl 27 the latter will be held in position to automatically engage the successive ratchet teeth 18 as the plunger is forced down by the operating lever, thus holding the plunger in its projected position while the lever is raised to permit the pawl 25 carried thereby to obtain a fresh grip on the teeth 17 on the opposite edge of the bar. When it is desired to raise the plunger the spring 28 is swung laterally out of engagement with the pawl 27 whereupon said pawl will spring back out of engagement with the teeth 18 and thus permit the plunger to be readily raised after the pressing of the bale has been completed.

In order to automatically retract the plunger after the bale has been completed and the pawl 27 disengaged from the plunger rod I provide suitable retracting weights 29 which are secured to the lower ends of the plunger retracting ropes or cables 30 which extend upwardly through guide passages 31 in the pressing bars or cleats 7 and pass around guide pulleys 32 which are revolubly mounted in suitable brackets 33 arranged in the upper portions of the standards or posts 13 of the sides 2. The ropes 30 after passing through the guide pulleys 32 are secured in apertured lugs or ears 34 arranged on the plunger 19 as shown.

In the rear side of the baling chamber is formed a series of vertically disposed slots 35 which extend from the bottom to near the top of the chamber as shown. In the inner side of the bottom of the chamber and in line with the slots 35 are formed a series of grooves 36. In the under side of the plunger 19 are formed grooves 37 which are also in line with the slots 35 in the rear of the baling chamber.

Before the material to be baled is placed in the press, binding wires 38 are inserted through the slots 35 in the rear side of the baling chamber and carried through the grooves in the bottom of the chamber and thence upwardly along the inner side of the door 5 and over the upper end of the same as shown. After the wires 38 have thus been arranged the material to be pressed is placed in the baling chamber and the plunger brought into engagement therewith. After the material has been pressed to the desired extent the door 5 is swung open and the ends of the wire which project through the slots 35 and above the upper cross bar 7 on the rear side of the press are inserted through the grooves in the bottom of the plunger and brought down over the outer side of the bale. In these ends of the wires are formed eyes with which are engaged the opposite ends of the wires which were formerly between the door and the front side of the bale. The engaged ends of the wires are twisted upon themselves in the form of loops whereby the ends of the wires are securely fastened together around the pressed bale. After the wires have thus been joined the plunger is raised and the finished bale removed from the press.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. In a baling press, an upright bale-forming chamber, a vertically slidable plunger in said chamber, a cross-piece above the top of the chamber, a plunger-projecting-bar rising from the plunger and guided in said cross-piece, said bar carrying ratchet teeth, a pivotally mounted plunger-projecting-lever, a pawl pivotally mounted intermediate its ends on said lever and having one end coacting with the ratchet teeth and its other end provided with a hook to engage said cross-piece to hold the lever in elevated position, pawl and ratchet mechanism for preventing upward movement of the plunger-projecting-bar, and means for elevating said bar and plunger when released by said pawl and ratchet mechanism.

2. In a baling press, a baling chamber, a plunger operatively mounted in said chamber, a plunger projecting bar having on its opposite sides a series of ratchet teeth, a pivotally mounted plunger projecting lever, a pawl carried by said lever and adapted to engage the teeth on one side of said plunger whereby the latter and the plunger are projected into the baling chamber, a spring operated pawl adapted to engage the teeth on the opposite side of said plunger rod whereby the latter and the plunger are held while the pawl carried by the lever is obtaining a fresh engagement with the teeth on the opposite side of the plunger rod, means whereby said holding pawl is disengaged from said plunger bar to permit the same and the plunger to retract, means to hold the plunger operating lever and its pawl out of engagement with the plunger rod, and means to automatically retract the plunger after the bale has been formed.

3. In a baling press, a baling chamber, a plunger operatively mounted in said chamber, a plunger operating bar having thereon series of ratchet teeth, a plunger projecting lever, a pawl carried by said lever and adapted to engage one series of teeth in said ratchet bar, a hook formed on the upper end of said pawl whereby the latter and said lever is supported in an inoperative position, a plunger holding pawl adapted to engage the other series of teeth on said plunger bar whereby the latter and said plunger are held while being operated by said lever, a pivoted spring adapted to hold said pawl in operative position to engage the teeth of the plunger bar, said spring being adapted to be turned out of engagement with said pawl whereby the latter will be disengaged from the teeth of the plunger bar, plunger retracting weights, flexible connections to attach said weights to said plunger whereby the latter is retracted after the pawl is released and means whereby the finished bale may be removed from the baling chamber.

4. In a baling press, a baling chamber comprising a box having one end hinged to form a door for discharging the finished bale from the chamber, a filling door arranged in the upper portion of said hinged end, plunger supporting posts formed on and projecting upwardly from the opposite sides of said chamber, a cross bar to connect the upper ends of said posts, said bar having formed therein a centrally disposed guide passage, a plunger slidably mounted in said baling chamber, a plunger rod secured to said plunger and projecting upwardly through said guide passage, series of ratchet teeth on said plunger rod, a handle socket pivotally connected to said cross bar, a handle or lever adapted to be engaged with said socket, a plunger projecting pawl pivotally mounted in the socket and adapted to engage one series of teeth on said plunger bar, a hook formed on the upper end of said pawl and adapted to be engaged with said cross bar to hold the pawl and lever out of engagement with the plunger operating bar, a pivoted plunger holding pawl adapted to be engaged with the teeth on said plunger operating bar whereby the plunger is held in its projected position, a spring to hold said pawl in operative engagement with the bar, guide pulleys arranged on said posts, plunger retracting cables connected to the plunger and passing over said pulleys, and plunger lifting weights connected to the lower ends of said cables whereby the plunger is retracted after the bale has been formed.

In testimony whereof I have hereunto set my hand in presence of two subscribing witnesses.

GEORGE F. WALTERS.

Witnesses:
H. F. BURKET,
JOHN F. BURKET.